United States Patent
Steklenski et al.

(10) Patent No.: US 6,892,948 B2
(45) Date of Patent: *May 17, 2005

(54) METHOD OF MEASURING DOSE OF LOCAL RADIATION

(75) Inventors: David J. Steklenski, Rochester, NY (US); Michael T. Wolf, Rochester, NY (US); Wayne K. Shaffer, Penfield, NY (US); James H. Griggs, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 146 days.

This patent is subject to a terminal disclaimer.

(21) Appl. No.: 09/995,081

(22) Filed: Nov. 27, 2001

(65) Prior Publication Data

US 2003/0098354 A1 May 29, 2003

(51) Int. Cl.⁷ .............................................. G06K 19/00
(52) U.S. Cl. .................... 235/487; 235/494; 235/491; 235/462.01; 235/462.08; 235/462.32; 250/474.1
(58) Field of Search ........................ 235/494, 487, 235/491, 462.01, 462.08, 462.32; 250/474.1, 252.1

(56) References Cited

U.S. PATENT DOCUMENTS

| | | | |
|---|---|---|---|
| 4,146,782 A | | 3/1979 | Barnich |
| 4,542,528 A | | 9/1985 | Sanner et al. |
| 4,578,571 A | | 3/1986 | Williams |
| 4,668,714 A | * | 5/1987 | Morita et al. ............... 523/136 |
| 5,637,876 A | * | 6/1997 | Donahue et al. .......... 250/474.1 |
| 5,767,520 A | * | 6/1998 | Donahue et al. .......... 250/474.1 |
| 5,777,341 A | * | 7/1998 | Seiwatz et al. ........... 250/474.1 |
| 5,910,847 A | * | 6/1999 | Van der Werf et al. ..... 356/401 |
| 6,268,602 B1 | * | 7/2001 | Seiwatz et al. ........... 250/252.1 |
| 6,284,198 B1 | * | 9/2001 | Kirollos et al. ................ 422/87 |
| 6,398,710 B1 | * | 6/2002 | Ishikawa et al. ................ 600/3 |
| 6,563,565 B2 | * | 5/2003 | Nishi ........................... 355/53 |

FOREIGN PATENT DOCUMENTS

| | | |
|---|---|---|
| DE | 196 37 471 A | 3/1997 |
| EP | 0389113 | 9/1990 |
| JP | 61057878 A | 3/1986 |
| JP | 01025085 A | 1/1989 |
| JP | 01046677 A | 2/1989 |
| JP | 01102388 A | 4/1989 |
| WO | WO 9900677 | 1/1999 |

OTHER PUBLICATIONS

T. Kojima et al., "Alanine Dosimeters Using Polymers as Binders", Applied Radiation & Isotopes, vol. 37, No. 6, (1986), Pergamon Journals Ltd., pp. 517–520.

* cited by examiner

Primary Examiner—Steven S. Paik
(74) Attorney, Agent, or Firm—Doreen Wells; Kathleen Neuner Manne

(57) ABSTRACT

A method of measuring an absorbed dose of ionizing radiation using a measuring device that bears an integral identification mark, comprising the steps of: providing a support; disposing on the support a first region capable of measuring an absorbed dose of ionizing radiation; disposing on the support a second region that bears integral identification mark; exposing at least the first region to a dose of ionizing radiation; and reading the signal from the first region.

25 Claims, No Drawings

US 6,892,948 B2

METHOD OF MEASURING DOSE OF LOCAL RADIATION

FIELD OF THE INVENTION

The present invention relates to a method of using a coated alanine element to provide accurate and simple measurement of doses of ionization radiation in a prescribed area of interest. The invention also relates to a method of identifying the source and other information about the element.

BACKGROUND OF THE INVENTION

There are various processes that utilize radiation—e.g., sterilization, radiation therapy, food irradiation, quality checking, etc.—and these processes have a need to verify the radiation dose. Similarly, there is a large number of different methods to determine a dose—e.g., ion dosimetry (ionization in air), calorimetry (determination of heat in carbon or metals), thermoluminescence dosimetry (luminescence in solids), etc. The formation of radicals in solid organic substances on irradiation has been observed and the concentration of these radicals is proportional to the absorbed dose over a wide range. Those radical concentrations can be determined easily by means of electron spin resonance (ESR) spectroscopy. Amino acids—e.g., alanine—have been widely used for this purpose due to its availability and the relative simplicity of incorporating it into practical dosimeters. An advantage of the use of organic materials such as alanine over inorganic dosimeter systems is that it can be assumed that the irradiation-induced changes in organic materials are closer to radiation effects in living tissues.

Amino acid dosimetry is an accepted method to determine the irradiation dose of different irradiation processes. On irradiating with ionizing radiation, radicals will be produced in amino acids like alanine which are stable for long periods. This is mainly due to the inhibition of radical-radical recombinations in the crystalline structure of the material that prevents the migration of large molecule fragments. The non-destructive evaluation of the radical concentration can be done using ESR spectroscopy. The determination of irradiation doses by means of ESR techniques requires a sensitive, robust and reliable instrument that can be served by a laboratory worker. A useful instrument provides such features as automated procedures for calibration and measurements. Careful adjustment of the ESR spectrometer and the selection of suitable dosimeters allows the determination of dose rates in a range from 2 Gy to 200 kGy with a total uncertainty of 3.5% (confidence level of 95%). Amino acid dosimeters are small, stable, and easy to handle. They are characterized by their large measuring range and a low sensitivity to temperature and humidity. This allows for their application in radiation therapy, the irradiation of blood, as well as in industrial facilities for irradiation. The dosimeter system can be used for reference and routine dosimetry due to its high quality and low costs.

Alanine dosimeters are well known in the art. For example, in the reference: T. Kojima et al., "Alanine Dosimeters Using Polymers As Binders", Applied Radiation & Isotopes, vol. 37, No. 6, (1986), Pergamon Journals Ltd., pp. 517–520, there are numerous references to dosimeters made in pellet, rod, and film formats. Dosimeters have been made both by industrial laboratories and at academic institutions. Most of these dosimeters are in the form of molded pellets or rods. The alanine is generally blended with a synthetic or natural rubber, compounded and molded under pressure to form a variety of shapes (U.S. Pat. No. 4,668,714, J.P. 203276 J.P. 0125085, J61057-878-8). There are also references in the literature to extruded films (J01102-388-A). These extruded products, while working well, have several deficiencies. Their manufacture often requires the use of high pressures and temperatures during the molding process requiring molding equipment that limits the sizes and shapes available. Molded dosimeters are also limited in that only moldable polymeric binders may be used. The use of molded dosimeters is also somewhat restrictive, as the size of the dosimeters tends to be very small, leading to difficulties in handling and possibly loss during irradiation.

A potential solution to these difficulties would be an amino acid dosimeter coated onto a flexible support wherein the support serves not only to hold the amino acid, but also provides the user with a length and width that allow easy handling. Such a coated dosimeter has been described in DE19637471 A. In this art, the alanine is coated from two, specific binders—a polyoctenamer or polystyrene. Both of these binders are brittle materials and made the coating of thick alanine layers with good mechanical properties very difficult, especially when the thickness of the dosimeter layer is >100 microns. The ability to bend and shape the amino acid dosimeter coated on to the plastic support can be very important in some applications, and is a significant limitation of the coated dosimeters described in the art.

The response of an amino acid dosimeter to ionizing radiation is proportional to the amount of amino acid coated on the dosimeter. While within a given manufacturing batch, the coated coverage may be very uniform, batch-to-batch variation makes it very important that dosimeters from a given batch be identifiable so calibration standards can be developed and used. Placing the lot number identification directly on the dosimeter is an excellent way to allow traceability back to the calibrations standard.

It would be useful to have a method of measuring an absorbed dose of ionizing radiation using a measuring device that is flexible and durable and that bears an integral identification mark.

SUMMARY OF THE INVENTION

The present invention overcomes the problems discussed above by providing a method of measuring an absorbed dose of ionizing radiation using a measuring device that bears an integral identification mark, comprising the steps of: providing a support; disposing on said support a first region capable of measuring an absorbed dose of ionizing radiation; disposing on said support a second region that bears an integral identification mark; exposing at least the first region to a dose of ionizing radiation; and reading the signal from the first region.

DETAILED DESCRIPTION OF THE INVENTION

Important to the manufacture of practical, coated, alanine dosimeters is the selection of binder materials that allow the coating of high fractions of alanine in the layer, and yet are flexible enough to allow the alanine layer to bend without cracking or breaking when coated at thickness >100 micron. Binders such as the polystyrene, mentioned in the previous art, are too brittle to allow a coating of the thick layers required. Far better are elastomeric binders that have high coefficients of elasticity and bond well both to plastic substrates and the alanine. Examples of such binders include solvent soluble polyesters, vinyl elastomers such as ethylene-vinylacetate copolymers, alkyl methacrylates and acrylates(propyl and above), and polyurethanes. The polyurethane binders are especially preferred for their excellent solvent solubility and high-level of adhesion to many plastic supports. Particularly preferred are the aromatic polyurethanes represented by Estane™ 5715 (B. F. Goodrich Inc) and aliphatic polyurethanes represented by Permuthane™ U6366 (Stahl Inc.). A key element in the choice of a binder is that the binder must not form free radicals that would interfere with the alanine signal upon exposure to ionizing radiation.

The binder is present at between 10 and 80 wt. % of the final layer. Most preferably the binder is present at between 35 and 50 wt. % of the final layer so as to provide optimum flexibility while still allowing a high coverage of the amino acid.

The support for the present alanine detector may be any one of a number of plastic supports such as polyethylene film, polyamide film, polyimide film, triacetate film, polypropylene film, polycarbonates, cellulosic supports, and polyester supports and the like, ordinary paper, and processed paper such as photographic paper, printing paper such as coated paper and art paper, baryta paper, and resin-coated paper. The support should be able to wrap around a rod of 0.1875"–0.25" without showing signs of cracking, crazing or other damage. The support should also be resistant to the effects of coating solvents and normal ambient conditions. The support is preferably a flexible plastic support. The preferred support is oriented polyester with a thickness of 2–14 mil. Most preferably, the polyester support would be within the range of 6–10 mil to provide reasonable stiffness for ease of handling while retaining the desired degree of flexibility for applications where bending of the dosimeter is required. The polyester would be clear in the preferred use, but white (pigmented with $TiO_2$ or $BaSO_4$) supports are also useful. A primary requirement of the pigment or tinting material is that it must not interfere with the signals generated by the alanine. In the preferred embodiment, the support is clear (non-pigmented and undyed). The support preferably contains an adhesion promoting sub layer to improve substrate wetting and the adhesion of the alanine layer.

Any amino acid may be use provided that, on irradiation with ionizing radiation, it produces radicals in proportion to the radiation dose received and that the radicals produced remain stable for a period of at least several hours so that the radical concentration can be read. For the purposes of the present invention, alanine is preferred. If alanine is used, it should be in the L-alanine form. The crystalline material should have a particle size in the range of 0.1–200 microns before coating. In order to form the alanine layer, crystals of L-alanine are dispersed in solvent along with the binder. In general, the alanine crystals are too large to be coated as they are received from the manufacturer and must be ground to smaller size. The particle size reduction can be accomplished by any standard method. Examples of such methods are dry grinding by means of a ball mill or attritor, wet milling by means of a media mill, rod milling, and hammer milling. Other methods such as precipitation, spray drying, and recrystallization are also useful. It is preferred that the alanine particles are less than 100 microns in size. It is particularly preferred that the alanine particles range between 1 and 40 microns in size.

Solvents for the dispersion may be any solvent that dissolves the binder, but solvents that evaporate quickly such as ketones(acetone, methylethyl ketone), alcohols (methanol, ethanol), acetates (methylacetate) and chlorinated solvents such as methylene chloride are preferred. Acetone, methylene chloride and mixtures of methylene chloride and methanol are particularly preferred.

Various addenda may be added to the alanine/binder mixture. Amorphous silica or alumina may be added in amounts from 0.1 to 5% of the weight of the alanine to improve particle flow characteristics. Preferably silica is the flow additive and is added at levels from 0.25–1% by weight of the alanine. Surfactants may also be added in amounts from 0.01–1% weight % of the total dispersion as coating and leveling aids. Preferred coating aids are the silicone additives typified by DC1248 manufactured by Dow Corning Inc.

Coating of the alanine-containing layer can be done by common coating methods such as dip coating, roll coating, and extrusion hopper coating. The alanine dispersion may be coated over the entire width/length of the support/dosimeter or over only a portion. Particularly preferred for application of the alanine-containing dispersion to the support is the use of extrusion hopper coating. This type of coating is well known to be able to lay down precise amounts of dispersion resulting in reproducible coverages for the final coating. After the dispersion is applied to the support, the coated layer is dried. Initial drying is done at relatively low temperatures, such as from 20–35° C. with restricted airflow to prevent the occurrence of drying defects such as cells, cracks, orange peel, and the like. The initial drying is followed by a second warming step at higher temperatures, from 50–120° C. where the layer is cured and the final amounts of solvent removed from the coating. The desired coating thickness is dependent on the radiation level that is to be detected with thicker layers required to detect lower doses. The thickness of the alanine layers of this invention can be from 10–300 microns. The preferred thickness is between 100 and 200 microns and most preferably between 125 and 175 microns where an excellent compromise between detectability and handling characteristics is obtained.

The alanine-containing layer is robust as formulated, however there may be occasions where a protective overcoat may be desirable. Such an overcoat would provide resistance to exposure to contamination and could serve to protect the dosimeter from exposure to excessive moisture. As in the case of the binder for the alanine-containing layer, a primary requirement of the overcoat layer is that it must not generate free radicals upon irradiation whose EPR signal interferes with that of the alanine. Typical overcoat polymers would possibly include acrylates, methacrylates, cellulosics such as cellulose acetate, polyesters, polyurethanes, and halogen-containing polymers and copolymers. The overcoat formulation will depend on the binder used for the alanine layer and must be such that the alanine layer is not significantly disturbed by its application.

The above describes the construction of the alanine-containing portion of the element. The other portion of the element contains the identification region of the dosimeter. In this region may be printed such information as manufacturing lot number, a unique dosimeter identification number, calibration information and the like. This information may be placed on the dosimeter by any common means. For example, the information could be printed by means of an inkjet printer. Other means such as gravure printing, offset printing and the like would also be useful. Such printing could be done directly onto the plastic substrate of the dosimeter, on top of a portion of the alanine-containing layer, or onto a label material affixed to the plastic substrate. A variety of additional coatings could also be made onto the plastic substrate of the dosimeter to provide a base for printed information or layers which could be subsequently transformed. Examples of such layers would include silver-halide based photographic layers, thermally active imaging layers and combinations of colored layers which could be etched or ablated to form characters.

A preferred substrate for the identification is a label that is adhered to the dosimeter substrate. Many methods commonly known in the art may be used to provide the label for the alanine dosimeter strip. Label materials such as paper, synthetic papers, and polymeric compositions, either filled or unfilled, may be used. Particular preferred are paper label materials because of their inexpensive nature, flexibility, and ease of availability.

Many adhesive systems are available for adhering the label material to the plastic film support of the dosimeter. Examples of such materials include the wide variety of pressure sensitive adhesives, hot melt adhesives, and thermally activated adhesives. The preferred adhesive system for this invention is a thermally activated adhesive. Thermally activated adhesives are solids and non tacky at room temperature, become adhesive and liquid at elevated temperature, and return to their non-tacky state upon cooling to room temperature. The use of a non-tacky adhesive is a key element in this invention. The ability to cut a long coated web of alanine dosimeter material into various shapes and sizes is made very difficult if the adhesive bonding the label material to the film support is tacky. Transfer of the adhesive to the cutting equipment blades or punches makes the use of high speed finishing equipment virtually impossible. The thermally activated adhesive allows easy cutting without any adhesive transfer. An example of a label material having the desired characteristics is 60# HMF Heat Seal 200 (Coating Specialty Inc.)

The desired dosimeter information can be printed on the label in many ways. Examples of such printing include inkjet, gravure printing, thermal techniques (the use of direct or indirect thermal label materials), laser printing, and laser ablation of applied ink. Preferred are methods that allow the printing of the label information during the finishing operations designed to cut the alanine web into the individual dosimeter strips. An example of a particularly preferred method is laser ablation of an ink layer applied to the surface of the paper or plastic label material. This method consists of the following steps:

a) coating the label material with a colored ink layer providing a high contrast with the paper or plastic label substrate.

b) applying the label material to the dosimeter substrate c) in predetermined portions that form an image, ablating away all of the colored coating using a laser.

Any dark coating can be applied onto the label substrate to provide the material to be ablated by the laser, so long as a minimum print contrast is achieved which allows reading of the image after laser ablation. Highly preferred are conventional black inks or coatings containing carbon black or a black dye. Both solvent-based and aqueous-based coatings are useful. The dark coating can be applied to either completely cover the label substrate, or to only partially cover it. The coverage is not critical, provided that it provide a reflectance of the dark coating, when read at 700 nm, that is less than about 5%. Excessive thicknesses (those greater than about 10 g/m2) should be avoided, as these require so much more laser ablation to remove. Because the black coatings are conventional, further details are unnecessary.

It is preferred that an intermediate layer be applied between the label substrate and the dark coating, of sufficient thickness that the ablation of the last-remaining dark coating at any one place, will ablate away at least some of the intermediate layer, without unduly distorting the underlying plastic. It is unimportant whether this intermediate layer is applied all at once or in layers, provided this thickness is achieved. The intermediate layer prevents the dark colored layer from soaking into the paper or plastic label substrate which would make obtaining a clean image very difficult. The actual minimum thickness of the intermediate layer required will vary, depending upon certain factors. That is, the power and effectiveness of the laser that is used will vary the thickness of the ablation that occurs—the more powerful the laser, the thicker the intermediate layer that might be required, since more of the intermediate layer may be ablated. Another factor is the ability of the intermediate layer to be ablated—if a binder is used that is more difficult to ablate, less thickness is required.

Any coating technique can be used to apply either or both the intermediate layer and the final colored layer that has the contrasting color. For example, conventional extrusion hopper coating, multi-slot dies, or multi-station hoppers can be used, preferably using a single pass to make each of the two layers.

Any laser capable of ablating away the dark coating without ablating away all of the intermediate layer is useful. Highly preferred for such purposes are conventional pulsed lasers that deliver high energy in one or more pulses on a short period of time. Most preferred are those that deliver at least 4 joules per 10–6 sec over an area of about 1.2 cm2, such as $CO_2$ lasers. Conventional TEA $CO_2$ lasers are well-known to be useful for this purpose, for example, as described in the article "Image Micro-machining with TEA $CO_2$ Lasers", Nelson et al, printed in 1975 in the SME Technical Paper identified as MR75-584. Still other useful lasers that deliver useful energy include pulsed YAG and scanning beam lasers such as continuous $CO_2$ or Q switched YAG lasers.

The information content of the identification region can be in the form of alpha-numeric characters or in the form of a barcode. It is highly advantageous if the information is in a form such that it is easily read by some sort of optical scanning device. It is preferred that at least a portion of the identification region contain a barcode for machine identification of the dosimeter.

Barcodes and their associated reading systems are widely known and used to facilitate manufacturing, shipment and inventory control of diverse goods, to assist in document control, and to aid in many additional tasks. Various barcode reading and laser scanning systems have been developed to scan and decode standard barcode formats and to generate digit representations to be used as inputs, typically, to computers for automatic processing and the like. Conventional barcode reading systems are discussed, for example, in U.S. Pat. No. 4,146,782 to Barnich; U.S. Pat. No. 4,542,528 to Sanner et al.; and U.S. Pat. No. 4,578,571 to Williams.

EXAMPLES

Examples of the Invention

1. Preparation of the Support

A roll of clear, polyester support of seven mil thickness and bearing an adhesion promoting sub layer was mounted to one of the unwind spindles of a Riston HRL 24 laminator. On the other unwind spindle was mounted a roll of 60# HMF Heat Seal 200 (Coating Speciality Inc.) paper label stock bearing a thermally activated adhesive on one side and a black ink layer and intermediate layer printed on the other side. The paper label stock was laminated to the polyester base by passing the two supports through the heated rolls of the laminator at a speed of 12 ft. per minute and a temperature of 110 degrees centigrade. The paper label material showed excellent adhesion to the polyester base.

2. Preparation of the Alanine Dispersion 224 grams of Estane™ 5715 were added to 1296 grams of methylene chloride and 144 grams of methanol and stirred until polymer was completely dissolved. To the polymer solution was added to 336 grams of L-alanine (Kyowa Hakko Inc.) and 1.0 grams of a silicone-based coating aid (DC 1248, Dow Corning Inc.). The resulting dispersion was passed through a media mill containing 0.003" diameter glass beads at a loading of 70% of the empty volume of the chamber. The rate at which the dispersion was passed through the mill was determined by measuring the particle size of the initial output from the mill and adjusting mill parameters (agitator speed and liquid throughput) to give the desired particle size distribution. The median particle size of the final dispersion was about 25 microns. The solids content of the dispersion was adjusted to between 25 and 30 percent to provide a coating viscosity of 500–1000 cps.

3. Coating of the Alanine Dispersion

The alanine dispersion prepared above was applied to the support by means of an extrusion hopper fed by a gear pump. The pumping rate was adjusted to give a coating thickness of about 130 microns. The coated alanine layer was dried in the coating machine through the use of forced warm air drying. Drying was done in stages with the initial drying being at lower temperatures 25–35° C. and reduced airflow, and the final drying being at 80–100° C. The support with its coated alanine layer was then wound in a roll.

4. Finishing of the Alanine Dosimeter Strips

The support coated in Step 3 above was mounted on to a precision chopping device. The support was fed through the guillotine blade of the chopper and strips of 4 mm width produced.

5. Writing of the Identification Information

A barcode and a series of alpha numeric characters sufficient to identify a dosimeter strip was written on to the label using a carbon dioxide laser to ablate the black ink which had been coated onto the label stock. The laser was a $CO_2$, flying-spot device run at 10 watts with a write speed of 20"/second. The barcode written was successfully scanned by several barcode readers typical of those in common use.

Comparative Example 1

Strips of the clear, 7 mil polyester support used above were cut to the same size as the dosimeters of the invention to demonstrate that the substrate did not provide signals which would distract from the signal obtained from the alanine.

Comparative Example 2

A solution of 15 gms of Estane™ 5715 were added to 76.5 grams of methylene chloride and 8.5 grams of methanol and stirred until polymer was completely dissolved. The polymer solution was coated onto the clear, 7 mil polyester support used above using a draw knife with a gap of 10 mils. The resulting coating was air dried and then dried in a forced air oven at 65° C. Strips of the coated polyester support were cut to the same size as the dosimeters of the invention to demonstrate that the combination of the substrate and Estane binder did not provide signals which would distract from the signal obtained from the alanine.

Comparative Example 3

A molded alanine pellet was obtained from Gamma Service Produktbestrahlung GmbH to show that the signal obtained from the dosimeter of the invention were comparable to those existing in the art.

Testing of the Alanine Dosimeter Strips

A. EPR Signal

The dosimeter strips and alanine dosimeter pellet were irradiated to a level of 20 kGy using a $cobalt_{60}$ radiation source. After irradiation, the dosimeter strips comparative examples were examined using an EPR spectrometer (Bruker Biospin™). The signal results are shown in Table 1.

| Example | EPR Signal |
| --- | --- |
| Comparative Example 1 | None |
| Comparative Example 2 | None |
| Comparative Example 3 | $1.85 \times 10^3$ |
| Invention Example 1 | $4.21 \times 10^3$ |

B. Flexibility Test

Alanine dosimeters of Example 1 were wrapped around a series of rods of decreasing diameters to demonstrate flexibility. Dosimeters were wrapped with the coated side facing the rod and with the coated side away from the rod. After wrapping, the dosimeters were unwrapped and examined for cracking, crazing, or other signs of damage. Rod diameters of 1", 0.5", 0.375" and 0.25" were used and none of the invention dosimeters showed any signs of damage.

The invention has been described in detail with particular reference to certain preferred embodiments thereof, but it will be understood that variations and modifications can be effected within the spirit and scope of the invention.

What is claimed is:

1. A method of measuring an absorbed dose of ionizing radiation using a measuring device that bears an integral identification mark, comprising the steps of:

providing a support;

coating on said support a first region for measuring an absorbed dose of ionizing radiation, said region comprising a binder and alanine;

disposing on said support a second region that bears an integral identification mark;

exposing at least the first region to a dose of ionizing radiation, wherein the alanine, upon exposure to ionizing radiation, produces radicals; and detecting the radicals in the first region.

2. The method of claim 1 further comprising a step of revealing the identification mark in the second region.

3. The method of claim 2 wherein the identification mark is revealed through the use of a laser.

4. The method of claim 1 further comprising a step of deciphering the identification mark in the second region.

5. The method of claim 1 wherein the identification mark is a bar code, a series of alpha-numeric characters or a combination thereof.

6. The method of claim 1 wherein the identification mark is on a substrate.

7. The method of claim 6 wherein the substrate for the identification mark is a label.

8. The method of claim 6 wherein the substrate for the identification mark is an intermediate layer and a dark-colored layer coated directly onto the support.

9. The method of claim 6 wherein the substrate for the identification mark extends partially over the alanine-containing layer.

10. The method of claim 1 wherein the identification mark is printed onto a strip.

11. The method of claim 1 wherein the radicals remain stable for at least 3 hours.

12. The method of claim 1 wherein the support is flexible.

13. The method of claim 1 wherein the alanine is in crystalline form.

14. The method of claim 13 wherein the crystalline alanine comprises particles less than 100 microns in size.

15. The method of claim 1 wherein the coated first region is between 100 and 200 microns thick.

16. A dosimeter comprising:

a support;

at least one first region disposed on said support, the first region containing alanine and a binder;

at least one second region disposed on said support;

wherein the first region is for measuring an absorbed dose of ionizing radiation and the second region bears an identification mark on a substrate.

17. The dosimeter of claim 16 wherein the identification mark is a bar code, a series of alpha-numeric characters or a combination thereof.

18. The dosimeter of claim 16 wherein the substrate for the identification mark is a label.

19. The dosimeter of claim 16 wherein the substrate for the identification mark is a label which is adhered to the support by means of a thermally activated adhesive.

20. The dosimeter of claim 16 wherein the substrate for the identification mark is a label the topmost surface of which is coated with an intermediate layer and a dark-colored layer.

21. The dosimeter of claim 16 wherein the substrate for the identification mark is a label the topmost surface of which is coated with an intermediate layer and a dark-colored layer which is black.

22. The dosimeter of claim 16 wherein the substrate for the identification mark is an intermediate layer and a dark-colored layer coated directly onto the support.

23. The dosimeter of claim 16 wherein the substrate for the identification mark extends partially over the alanine-containing layer.

24. The dosimeter of claim 16 wherein the identification mark is revealed through the use of a laser.

25. The dosimeter of claim 16 wherein the identification mark is printed onto a strip.

* * * * *